United States Patent
Suzuki et al.

(10) Patent No.: US 8,151,002 B2
(45) Date of Patent: Apr. 3, 2012

(54) INFORMATION CONVERSION APPARATUS, INFORMATION CONVERSION METHOD, INFORMATION CONVERSION PROGRAM AND RELAY DEVICE

(75) Inventors: Tomoyasu Suzuki, Chiba (JP); Kazuto Okada, Saitama (JP)

(73) Assignee: Oki Networks Co., Ltd., Tokyo (JP)

( * ) Notice: Subject to any disclaimer, the term of this patent is extended or adjusted under 35 U.S.C. 154(b) by 33 days.

(21) Appl. No.: 12/656,302

(22) Filed: Jan. 25, 2010

(65) Prior Publication Data
US 2010/0228813 A1 Sep. 9, 2010

(30) Foreign Application Priority Data
Mar. 5, 2009 (JP) ................................. 2009-052341

(51) Int. Cl.
*G06F 15/16* (2006.01)
*H04L 12/28* (2006.01)

(52) U.S. Cl. ....................................... 709/245; 370/401
(58) Field of Classification Search .................. 709/245; 370/401
See application file for complete search history.

(56) References Cited

U.S. PATENT DOCUMENTS
| | | | |
|---|---|---|---|
| 7,072,338 B2 * | 7/2006 | Tsuchiya et al. | 370/392 |
| 2004/0141513 A1 * | 7/2004 | Takechi et al. | 370/401 |
| 2004/0198413 A1 * | 10/2004 | Smith et al. | 455/550.1 |
| 2008/0304482 A1 * | 12/2008 | Grassi et al. | 370/389 |

FOREIGN PATENT DOCUMENTS
| | | |
|---|---|---|
| JP | 2007-104676 A | 4/2007 |
| JP | 2008-092607 A | 4/2008 |

* cited by examiner

*Primary Examiner* — Asghar Bilgrami
(74) *Attorney, Agent, or Firm* — Rabin & Berdo, P.C.

(57) ABSTRACT

There is provided an apparatus including an information conversion apparatus provided to a relay device for relaying between a server to which a first network address is allocated and a client terminal to which a second network address is allocated, the information conversion apparatus including: an analyzer which analyzes a message corresponding to Layer 7 of an OSI basic reference model of a received packet and determines whether a URL expressed as a literal network address is included; and an address converter which mutually converts, when a URL expressed as a literal network address is included, the literal network address in the URL between the first network address and the second network address.

5 Claims, 5 Drawing Sheets

FIG. 2 a ↘

EXPRESSION OF IPv4 ADDRESS 200. 0. 0. 1 b ↘

EXPRESSION OF IPv6 ADDRESS

3ffe:100:0:0:0:0:0:1

(SHORTENED EXPRESSION  3ffe:100::1)

FIG. 3
(IPv4) 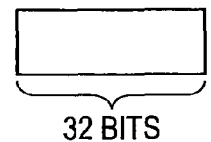
32 BITS
(PREFIX) 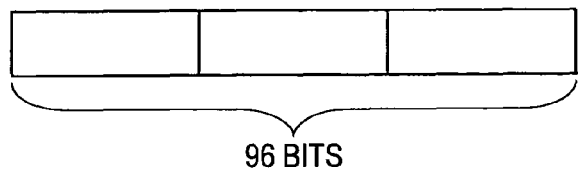
96 BITS
(IPv6) 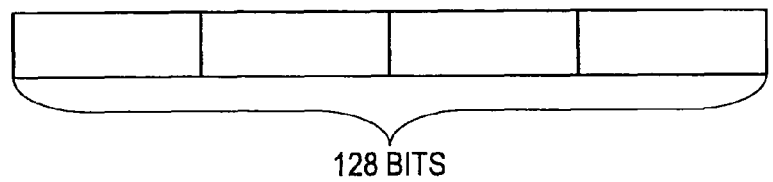
128 BITS
FIG. 4
(IPv6) 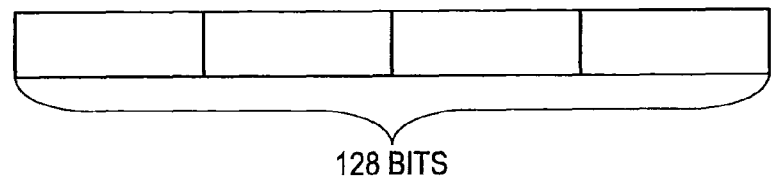
128 BITS
(PREFIX) 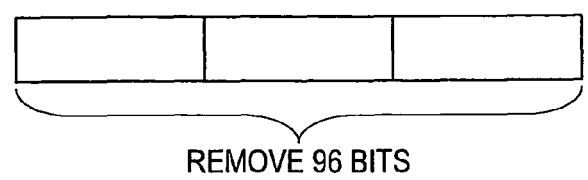
REMOVE 96 BITS
(IPv4) 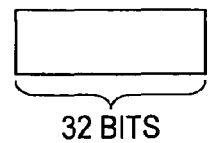
32 BITS

FIG. 6

| NAME | CLASS | TYPE | IP ADDRESS |
|---|---|---|---|
| www.fool.com | IN | A | 200.0.0.1 |
| ... | ... | ... | ... |

INFORMATION CONVERSION APPARATUS, INFORMATION CONVERSION METHOD, INFORMATION CONVERSION PROGRAM AND RELAY DEVICE

BACKGROUND OF THE INVENTION

1. Field of the Invention

The present invention relates to an information conversion apparatus, an information conversion method, an information conversion program and a relay device.

2. Description of the Related Art

In recent years, in order to solve a shortage of IPv4 addresses, switching to IPv6 addresses has been proposed. However, in view of widespread network technologies and social penetrations, it is considered to be difficult to switch IPv4 addresses to IPv6 addresses at once and a configuration for using both of the IPv4 networks and IPv6 networks are being examined.

It is thus desired to smoothly perform communications between an IPv4 network and an IPv6 network.

Japanese Patent Application Laid-Open No. 2008-092607 describes a translator technology that establishes a communication between networks in different versions, which has different IP address application systems.

When a packet is transferred from an IPv6 network to an IPv4 network, the translator described in JP-A No. 2008-092607 extracts an IPv4 address from low-order 32 bits of an IPv6 address stored in a destination IP address field of an IPv6 packet and stores the address to a destination IP address field of an IPv4 packet.

Further, when a packet is transferred from the IPv4 network to the IPv6 network, the translator converts an IPv4 address stored in a transmitter IP address field of the IPv4 packet to an IPv6 address stored in the low-order 32 bits and stores the address to a transmitter IP address field of the IPv6 packet.

According to the technology described in JP-A No. 2008-092607, since IP addresses can be converted on Layer 3 (a network layer) of the OSI (Open Systems Interconnection) reference model, a communication between an IPv6 node and an IPv4 node can be realized.

However, it is difficult to realize communications between applications including IP addresses on Layer 7 (an application layer) of the OSI reference model. This is because the technology of JP-A No. 2008-092607 performs an address conversion regarding only IP headers on Layer 3 and may not convert address information written in IP payloads on Layer 7.

Further, JP-A No. 2007-104676 describes a technology related to a communication method for realizing a VoIP communication between a VoIP terminal based on IPv4 and a VoIP terminal based on IPv6.

JP-A No. 2007-104676 describes a VoIP (Voice Over Internet Protocol) terminal that has a message format conversion unit including a network interface for transmitting and receiving data to and from any terminal via a network. The message format conversion unit performs a format conversion of address information to an address format of any terminal, inserts the format-converted address information to a message and sends the message to the terminal. The message format conversion unit also performs a format conversion of address information included in a message received from any terminal to a predetermined address format and provides a message including the format-converted address information to a VoIP application.

According to the technology described in JP-A No. 2007-104676, regarding an application of VoIP having address information on Layer 7, it is possible to realize a communication between an IPv6 terminal and an IPv4 terminal in which applications operate.

SUMMARY OF THE INVENTION

However, there may occur a situation in which the technologies described in JP-A No. 2008-092607 and JP-A No. 2007-104676 may not be applied to a communication between an HTTP client operating in an IPv6 terminal (hereinafter, referred to as IPv6 client) and an HTTP server operating in an IPv4 server (hereinafter, referred to as IPv4 server), regarding HTTP protocols.

Such a situation may occur when address information of IPv4 is written in a Web content disclosed via the IPv4 server, for example. An example of such a situation will be described below.

Generally, a Web content can be represented as a collection of document data in a text format which is generated in an HTML (Hyper Text Markup Language). The document data is associated with a URL (Uniform Resource Locator) for uniquely specifying its location on a network. As an example of the URL, the format is a text character string such as "http://www.foo1.com/www/index.html", for example.

One piece of the document data may include URLs of other pieces of document data. The URLs of other pieces of document data written in the document data is referred to as a "hyperlink". As an example or the hyperlink, the format is a text character string such as "<a href="http://www.foo2.com/www/index.html>link1</a>" between tags <a> and </a>, for example.

In general, upon receiving an input of URL from a user, a Web browser having a function to display a Web content specifies an HTTP server having document data corresponding to the input URL, obtains the document data from the specified HTTP server and displays the data on the browser. Further, the Web browser displays the hyperlink in the displayed document data in a format visually different from other sentences. By clicking the hyperlink using a mouse and the like, another piece of document data related to the displayed document data is obtained from the HTTP server and displayed on the browser in a procedure similar to a procedure when the user input the URL.

Normally, a URL is represented in a format of FQDN (Fully Qualified Domain Name). By inquiring of the DNS (Domain Name System), the Web browser can obtain an IP address of the HTTP server based on the FQDN.

However, a URL may be cited not in the FQDN but as an literal character string of an IP address of the HTTP server. Such a URL is described as "http://200.0.0.1/www/index.html", for example, in which the IP address of the HTTP server is described in a text format.

In this case, the Web browser can try to connect to the HTTP server using the literal IP address ("200.0.0.1" in the above example) directly extracted from the URL without inquiring of the DNS about the IP address of the HTTP server.

Here, when both of the terminal in which the Web browser operates and the HTTP server belong to the IPv6 network, or, when both of the terminal and the HTTP server belong to the IPv4 network, the document data can be referred as described above even if the IP address is cited in the URL of the hyperlink.

However, when the terminal in which the Web browser operates belongs to the IPv6 network and the HTTP server belongs to the IPv4 network and when the URL in the document data obtained by the Web browser is expressed as an IP address, an issue may occur that, even if it is tried to display the corresponding URL on the Web browser, the IPv6 terminal tries to access directly to the HTTP server of IPv4; however, the communication is not established and the corresponding document data may not be displayed.

Regarding this issue, since the technology described in JP-A No. 2008-092607 is a conversion technology of IP addresses on Layer 3 as described above, the technology may not be applied to Layer 7 corresponding to the HTTP and may not solve the issue.

Further, the technology described in JP-A No. 2007-104676 relates to a communication between an IPv6 terminal and an IPv4 terminal and can be applied to Layer 7; however, the technology is limited to VoIP protocols and may not solve the above issue.

Thus, for example, an information conversion apparatus, an information conversion method, an information conversion program and a relay device that are capable of maintaining a communication using an HTTP protocol between devices belonging to different networks such as between an IPv6 network and an IPv4 network have been desired.

According to another embodiment of the present invention, there is provided a method which includes According to the embodiments of the present invention described above, According to an embodiment of the present invention, there is provided an information conversion apparatus provided to a relay device for relaying between a server to which a first network address is allocated and a client terminal to which a second network address is allocated. The information conversion apparatus includes (1) an analyzer which analyzes a message corresponding to Layer 7 of an OSI basic reference model of a received packet and determines whether a URL expressed as a literal network address is included; and (2) an address converter which mutually converts, when a URL expressed as a literal network address is included, the literal network address in the URL between the first network address and the second network address.

According to another embodiment of the present invention, there is provided an information conversion method of an information conversion apparatus provided to a relay device for relaying between a server to which a first network address is allocated and a client terminal to which a second network address is allocated. The information conversion method includes steps of (1) analyzing, by an analyzer, a message corresponding to Layer 7 of an OSI basic reference model of a received packet and determining whether a URL expressed as a literal network address is included; and (2) when a URL expressed as a literal network address is included, mutually converting, by an address converter, the literal network address in the URL between the first network address and the second network address.

According to another embodiment of the present invention, there is provided an information conversion program for an information conversion apparatus provided to a relay device for relaying between a server to which a first network address is allocated and a client terminal to which a second network address is allocated to function as:

(1) an analyzer which analyzes a message corresponding to Layer 7 of an OSI basic reference model of a received packet and determines whether a URL expressed as a literal network address is included; and (2) an address converter which mutually converts, when a URL expressed as a literal network address is included, the literal network address in the URL between the first network address and the second network address.

A relay device for relaying between a server to which a first network address is allocated and a client terminal to which a second network address is allocated, the relay device comprising: the information conversion apparatus of the present invention.

According to the present invention, a communication can be maintained between devices belonging to different networks such as an IPv6 network and an IPv4 network by mutually converting literal network addresses of a URL written in Layer 7 of the OSI basic reference model.

BRIEF DESCRIPTION OF THE DRAWINGS

FIG. 2 is an explanatory diagram showing an example of expression of an IPv4 address and an IPv6 address;

FIG. 3 is an explanatory diagram of a method for converting an IPv4 address format into an IPv6 address format according to the first embodiment;

FIG. 4 is an explanatory diagram of a method for converting an IPv6 address format into an IPv4 address according to the first embodiment;

FIG. 6 is a block diagram showing a configuration of a correspondence table in a DNS server according to the first embodiment.

DETAILED DESCRIPTION OF THE EMBODIMENT(S)

Figure 1:
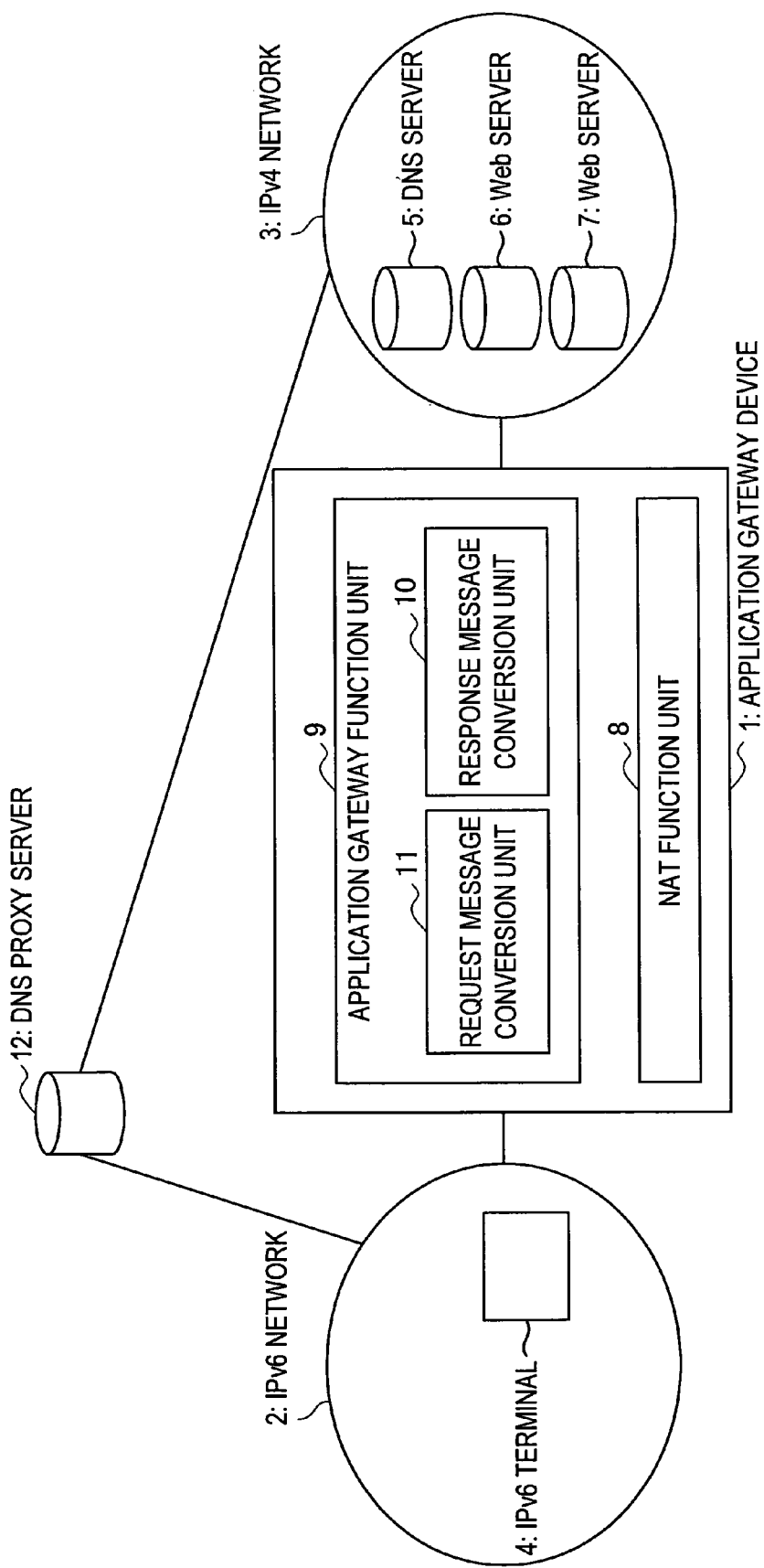
FIG. 1 is a block diagram showing a configuration of a communication network and an internal configuration of an application gateway device according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(A) First Embodiment

A first embodiment of an information conversion apparatus, an information conversion method, an information conversion program and a relay device of the present invention will be described below with reference to the drawings.

(A-1) Configuration of First Embodiment

FIG. 1 is a block diagram showing a configuration of a communication network and an internal configuration of an application gateway device of the first embodiment.

In FIG. 1, a communication network 50 of the first embodiment includes at least an application gateway device 1, an IPv6 network 2, an IPv4 network 3 and a DNS proxy server 12.

The IPv6 network 2 is a communication network in which unique IPv6 addresses are allocated. On the IPv6 network 2, there is an IPv6 terminal 4 having an allocated IPv6 address.

The IPv6 terminal 4 is a communication terminal which has the allocated IPv6 address and activates an HTTP client application such as a Web browser, for example. The IPv6 terminal 4 may be, for example, a personal computer that has a communication function, a mobile phone that has a communication function or a hand-held terminal such as a PDA or a game machine.

The IPv4 network 3 is a communication network in which IPv4 addresses are allocated. In this IPv4 network 3, there are a DNS server 5, a Web server 6 and a Web server 7 which have allocated IPv4 addresses.

The DNS server 5 is an address resolver for resolving an IP address of a device on the IPv4 network 3 and is configured to respond an IP address of a server of a URL requested using an HTTP request message.

The Web server 6 and Web server 7 are Web servers that provide Web contents. In the first embodiment, for the sake of convenience in description, it is assumed that a URL of the Web server 7 is written in a Web content provided by the Web server 6 and the URL is a character string having a literally expressed IP address. On the other hand, it is assumed that a URL expressed as an FQDN format is written in a Web content provided by the Web server 7.

The application gateway device 1 is disposed at a boundary of the IPv6 network 2 and IPv4 network 3 and configured to perform a packet transfer between the IPv6 terminal 4 and the Web server 6 or Web server 7.

As shown in FIG. 1, the application gateway device 1 has an NAT (Network Address Translation) function unit 8 and an application gateway function unit 9.

The NAT function unit 8 is configured to perform a conversion process between a single global address (IPv6 address) and plural private addresses (IPv4 addresses). Further, the NAT function unit 8 is configured to transfer IPv6 packets on the IPv6 network 2 and IPv4 packets on the IPv4 network 3 on Layer 4 of the OSI reference model. Further, the NAT function unit 8 may be configured to convert a content of a TCP or UDP header (a port number, for example) according to need, in addition to an IP header (an NAPT function, for example). Here, the NAT function unit 8 may be configured to include RFC 2765, RFC 2766 standardization technologies which are standardized by IETF (Internet Engineering Task Force).

The application gateway function unit 9 is configured to analyze an HTTP message corresponding to Layer 7 of the OSI reference model and maintain a communication between the IPv6 terminal 4 and the IPv4 terminal (Web server 6, for example).

As shown in FIG. 1, the application gateway function unit 9 has a response message conversion unit 10 and a request message conversion unit 11.

The response message conversion unit 10 is configured to determine whether there is a URL in an HTTP response message received from the Web server 6 or 7 when a communication is executed between the IPv6 terminal 4 and the Web server 6 or 7.

As a method for detecting a presence or an absence of a URL, for example, since the HTTP response message is written in an HTML format, the response message conversion unit 10 can detect a presence or an absence of a URL by detecting a tag (<a>, </a>, for example) that indicates an insertion of URL.

When a URL is included in the HTTP response message, the response message conversion unit 10 determines whether the URL is being expressed as a literal IP address. When the URL is being expressed as a literal IP address, the response message conversion unit 10 also determines whether the IP address is an IPv6 address or an IPv4 address.

Here, as a method for determining whether the URL is expressed as a literal IP address, for example, since the URL is written in a text format, it can be determined whether the URL is written in an FQDN format such as "http://www.foo1.com/www/index.html" or in a format including a literal IP address such as "http://200.0.0.1/www/index.html."

Further, as a method for determining whether the IP address is an IPv4 address or an IPv6 address, for example, it can be determined based on the format of the IP address written in the URL. For example, FIG. 2 shows a method for expressing an IPv4 address and an IPv6 address. The response message conversion unit 10 can determine based on the difference of expression of character strings since the IPv4 address is expressed as a character string such as "200", ". (period)", "0", ". (period)" and the like as shown in an example of "200.0.0.1" in "a" of FIG. 2 and the IPv6 address is expressed as a character string such as "3ffe", ": (colon)", "100", ": (colon)" and the like as shown in an example of "3ffe:100:0:0:0:0:0:1" in "b" of FIG. 2.

Further, as another method for detecting whether the IP address is an IPv4 address or an IPv6 address, for example, in RFC 2732, when a literal IPv6 address is applied, square brackets "[" and "]" are used. Thus, another method may be employed in which the response message conversion unit 10 determines that the URL is an IPv6 address when square brackets are used in URL and determines that the URL is an IPv4 address when there is no square bracket.

Further, when a URL expressed as a literal IPv4 address is included in the HTTP response message addressed to the IPv6 terminal 4, the response message conversion unit 10 is configured to convert the IPv4 address to the address in an IPv6 format.

Here, a method for converting an IPv4 address format to an IPv6 address format will be described with reference to FIG. 3.

As shown in FIG. 3, an IPv4 address has 32 bits and an IPv6 address has 128 bits. Further, to a line interface of the application gateway device 1 to be connected to the IPv6 network 2, an IPv6 address is allocated and its prefix has 96 bits.

The response message conversion unit 10 converts the address in the IPv4 format to an address in the IPv6 format by setting the IPv4 address as lower-order 32 bits and applying the prefix (96 bits) of the IPv6 address allocated to the line interface connected to the IPv6 network 2 as high-order 96 bits.

With this configuration, even in a case where the IPv6 terminal 4 accesses the Web server on the IPv4 network 3 by tracking the converted IPv6 address, since the prefix of the literal IPv6 address in the URL indicates the line interface of the application gateway device 1, the HTTP request message from the IPv6 terminal 4 is sent to the Web server via the application gateway device 1 and the communication can be maintained.

When a communication is executed between the IPv6 terminal 4 and the Web server 6 or 7, the request message conversion unit 11 is configured to determine whether a URL is included in the HTTP request message received from the IPv6 terminal 4.

Further, when a URL is included in the HTTP request message, the request message conversion unit 11 determines whether the URL is expressed as a literal IP address. When the URL is expressed as a literal IP address, the request message conversion unit 11 determines whether the IP address is an IPv6 address or an IPv4 address.

Further, when a URL expressed as a literal IPv6 address is included in the HTTP request message addressed to the IPv4 network 3, the request message conversion unit 11 converts the IPv6 address to an address in an IPv4 format.

Note that the method for determining a presence or an absence of a URL, method for detecting an IP address and method for determining whether an IPv4 address or an IPv6 address are the same as those in the response message conversion unit 10.

Here, a method for converting an IPv6 address to an IPv4 address will be described with reference to FIG. 4.

In FIG. 4, the request message conversion unit 11 converts an IPv6 address to an IPv4 address by removing the prefix part in the high-order 96 bits among the 128-bit IPv6 address in the URL and remaining only the part of the low-order 32 bits.

The DNS proxy server 12 is a server that relays a DNS inquiry from the IPv6 terminal 4 to the DNS server 5. Noted that the response message conversion unit 10 and the request message conversion unit 11 correspond to an analyzer which analyzes a message corresponding to Layer 7 of an OSI basic reference model of a received packet and determines whether a URL expressed as a literal network address is included, and an address converter which mutually converts, when a URL expressed as a literal network address is included, the literal network address in the URL between the first network address and the second network address.

(A-2) Operation According to First Embodiment

Next, an operation of communication processing in the communication network 50 of the first embodiment will be described with reference to the drawings.

Figure 5:
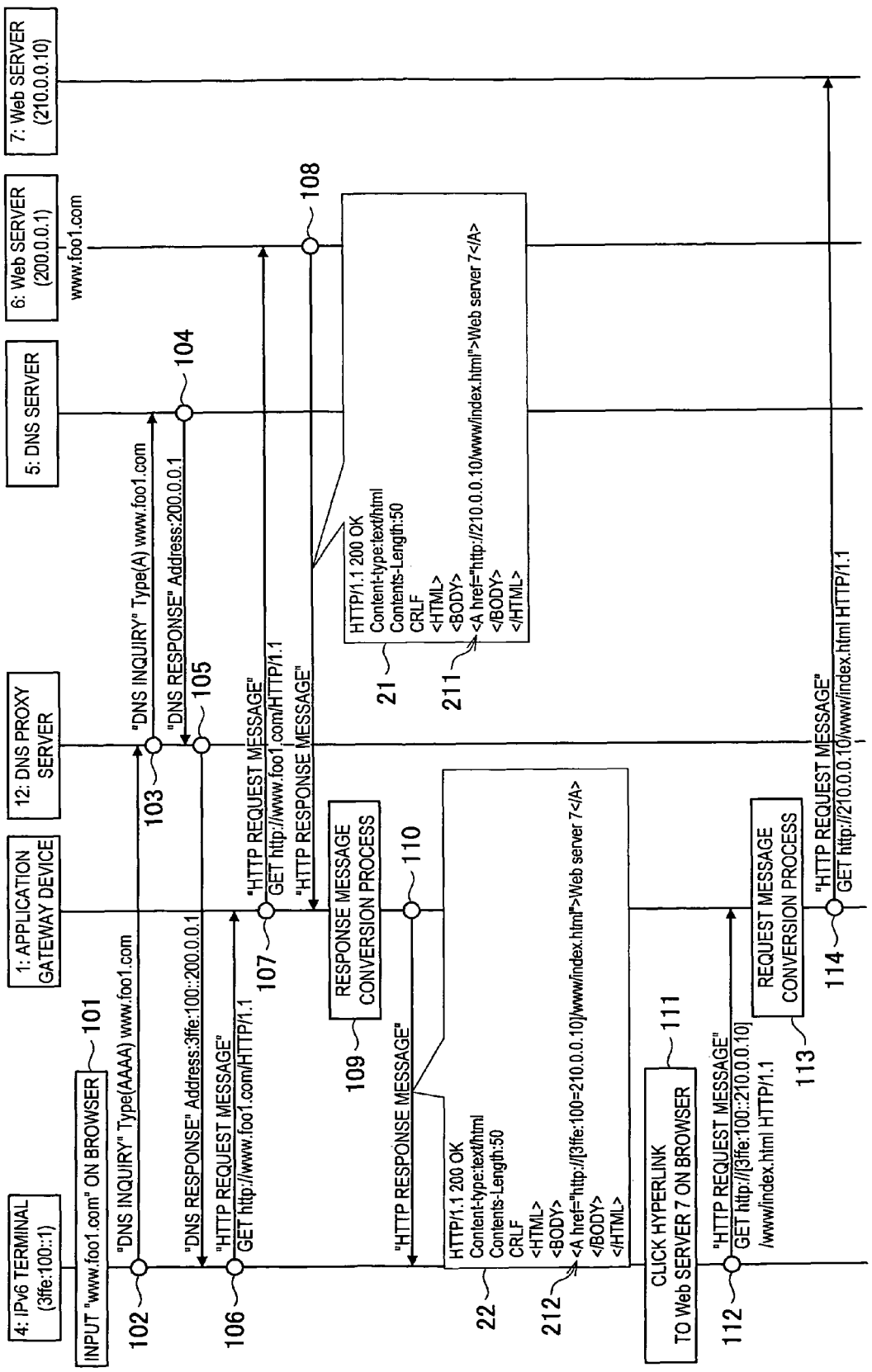
FIG. 5 is a sequence diagram showing an operation of a communication processing in a communication network according to the first embodiment.

FIG. 5 is a sequence diagram showing an operation of communication processing in the communication network 50 according to the first embodiment.

Firstly, a user inputs a URL (www.foo1.com) corresponding to the Web server 6 via a Web browser of the IPv6 terminal 4 (step 101).

The IPv6 terminal 4 inquires of the DNS proxy server 12 about an IP address of "www.foo1.com" in IPv6 (step 102).

The DNS proxy server 12 inquires of the DNS server 5 about an IP address of "www.foo1.com" using an IPv4 packet (step 103).

The DNS server 5 has a correspondence table including previously registered FQDNs and IP addresses. FIG. 6 shows a configuration example of the correspondence table. The DNS server 5 refers to the correspondence table shown in FIG. 6, searches an IP address corresponding to the URL "www.foo1.com" of the received inquiry, and returns an IP address (200.0.0.1) of the Web server 6 as a DNS response (step 104).

The DNS proxy server 12 sends, to the IPv6 terminal 4, a DNS response in which the IPv4 address of the Web server 6 stored in the DNS response is replaced with an IPv6 address (step 105).

Here, to the series of the processes of the DNS proxy server 12, a standardization technology of RFC 2766 can be applied, for example. Further, as a method for replacing an IPv4 address of the Web server 6 to an IPv6 address, for example, there is a method in which the application gateway device 1 applies the same value as a prefix of an interface of a line connected to the IPv6 network 2 and applies an IPv4 address of the Web server 6 to the low-order 32-bit address.

The IPv6 terminal 4 sends an HTTP request message to the IPv6 address which indicates the Web server 6 (step 106).

The HTTP request message sent from the IPv6 terminal 4 is transferred to the application gateway device 1 via a network device such as a router, for example.

In the HTTP request message received by the application gateway device 1, information of an IP header and a TCP header up to Layer 4 is converted from an IPv6 format to an IPv4 format by the NAT function unit 8. To the implementation of the NAT function unit 8, a standardization technology of RFC 2765, RFC 2766 or the like can be applied, for example.

In this case, since the HTTP request message in the data of the TCP does not include an expression of a literal IP address, the HTTP request message is not processed in the application gateway function unit 9 and sent to the Web server 6 (step 107).

When the Web server 6 receives the HTTP request message, the Web server 6 sends document data in a specified HTML format as an HTTP response message to response to the received HTTP request message (step 108).

When the application gateway device 1 receives the HTTP response message, in the application gateway device 1, the response message conversion unit 10 analyzes the document data in an HTML format included in the HTTP response message and detects a part which is defined as a hyperlink.

Then, the response message conversion unit 10 determines whether the part defined as a hyperlink includes a literal IPv4 address.

Here, when a literal IPv4 address is detected, the response message conversion unit 10 converts the literal IPv4 to a literal IPv6 address (step 109).

FIG. 5 shows a configuration example of the HTTP response message 21 from the Web server 6, for example. In the HTTP response message 21 shown in FIG. 5, a linked page in the Web server 7 is written between tags <A> and </A> in a body of the HTML and the response message conversion unit 10 detects a part defining a hyperlink by analyzing the message in an HTML format and detecting the <A></A> tags 211.

Further, the response message conversion unit 10 determines whether the linked page written in the <A></A> tags 211 is what is expressed as the literal IP address or whether the expressed IP address is in an IPv4 format or an IPv6 format.

In the case of the HTTP response message 21 shown in FIG. 5, based on a character string of "<A href="http://210.0.0.10/www/index.html">Web server 7</A>" written in the <A></A> tags 211, the response message conversion unit 10 determines that the URL is what is literally expressed as the IPv4 (210.0.0.10).

Further, the response message conversion unit 10 converts the IPv4 address into an IPv6 format by applying the prefix of the IPv6 address allocated to the interface of the line via which the application gateway device 1 connects to the requesting IPv6 network 2 to the above 96 bits and applying the IPv4 address of the Web server 7 to the low-order 32 bits.

For example, in a case of FIG. 5, in the application gateway device 1, since the prefix (3ffe:100:0:0:0:0) of the IPv6 address allocated to the interface of the line to connect to the IPv6 network 2 has 96 bits, the response message conversion unit 10 applies the prefix to the high-order 96-bit part and applies the IPv4 address (210.0.0.10) of the Web server 7 to the low-order 32-bit part. With this configuration, it is possible to replace with a 128-bit IPv6 address "3ffe:100:0:0:0:0:210.0.0.10" (a shortened expression is "3ffe:100::210.0.0.10").

In this case, according to the standardization technology of RFC 2732, the response message conversion unit 10 brackets the converted IPv6 address part with square brackets "[" and "]", and converts the URL expression of the Web server 7 written in the HTTP response message 21, that is, "<A href="http://210.0.0.10/www/index.html">Web server 7</A>", into "<A href="http://[3ffe:100::210.0.0.10]/www/index.html">Web server 7</A>" (step 109).

Then, the NAT function unit 8 converts information of an IP header and a TCP header up to Layer 4 of the HTTP response message from the IPv4 format to the IPv6 format and sends the converted information to the IPv6 terminal 4 (step 110).

When the HTTP response message is given to the IPv6 terminal 4, a content of the Web server 6 requested in step 101 is displayed on the browser of the IPv6 terminal 4. To the content from the Web server 6, a hyperlink to the Web server 7 is applied and a user clicks this hyperlink (step 111).

When the user clicks the hyperlink to the Web server 7, the browser analyzes the URL of the clicked hyperlink and recognizes that the host portion is not an FQDN but a literal IPv6 address.

The literal IPv6 address is an address in which the IPv4 address of the Web server 7 is indicated in the IPv6 address and corresponds to a line address of the application gateway device 1. Thus, the IPv6 terminal 4 sends an HTTP request message to the application gateway device 1 (step 112).

In the application gateway device 1, the request message conversion unit 11 receives the HTTP request message from the IPv6 terminal 4.

The request message conversion unit 11 determines that a literal IPv6 address is included in the HTTP request message and that a prefix of the IPv6 address is the prefix applied by the response message conversion unit 10.

Then, when a literal IP address is included and the prefix is what is applied by the response message conversion unit 10, the request message conversion unit 11 replaces with a literal IPv4 address by removing the literal IPv6 address and remaining only the low-order 32 bits (step 113).

After that, the NAT function unit 8 converts the information of the IP header and the TCP header up to Layer 4 of the HTTP request message from the IPv6 format to the IPv4 format and sends to the Web server 7 (step 114).

With this configuration, the HTTP request message can be sent to the Web server 7. Further, upon receiving the HTTP request message, the Web server 7 sends an HTTP response message including requested document data.

Here, since a literal IP address is not written as a URL in the Web content of the Web server 7, the response message conversion unit 10 does not perform a conversion process on the HTTP response message from the Web server 7 and only the address conversion by the NAT function unit 8 is performed to maintain the communication.

(A-3) Effects of First Embodiment

As described above, according to the first embodiment, even in a case where a terminal in which a Web browser operates belongs to an IPv6 network, an HTTP server belongs to an IPv4 network and a URL in document data obtained by the Web browser is expressed as a literal IPv4 address, an application gateway device analyzes data on Layer 7 of the IP packet and mutually converts literal IPv6 addresses and literal IPv4 addresses in HTTP response messages and HTTP request messages. As a result, the Web browser can be connected to an HTTP server of IPv4 based on the corresponding URL and obtains corresponding document data, thereby displaying the data on a screen.

(B) Other Embodiments

The first embodiment describes, as an example, a case of an application gateway device capable of performing an HTTP communication on an IPv6 network and an IPv4 network; however, the present invention is not limited to the HTTP communications and can be applied to communications of application protocols that uses literal IP addresses in IP packet payloads.

Further, the first embodiment describes, as an example, a case where an HTTP server exists in an IPv4 network and an HTTP client exists in an IPv6 network; however, the method for converting the literal IP addresses in HTTP messages can be similarly applied to a case where an HTTP server exists in an IPv6 network and an HTTP client exists in an IPv4 network.

It should be understood by those skilled in the art that various modifications, combinations, sub-combinations and alterations may occur depending on design requirements and other factors insofar as they are within the scope of the appended claims or the equivalents thereof.

For example, the present invention can be applied to a relay device that maintains communications by utilizing HTTP protocol between different networks, similarly to communications between an IPv6 network and an IPv4 network.

The present application contains subject matter related to that disclosed in Japanese Priority Patent Application JP 2009-052341 filed in the Japan Patent Office on Mar. 5, 2009, the entire content of which is hereby incorporated by reference.

What is claimed is:

1. An apparatus for relaying between a server to which a first network address is allocated and a client terminal to which a second network address is allocated, comprising:
   an analyzer which analyzes a message corresponding to Layer 7 of an OSI basic reference model of a received packet and determines whether a URL expressed as a literal network address is included in the message; and
   an address converter which mutually converts, when a URL expressed as a literal network address is included in the message, the literal network address in the URL between the first network address and the second network address; and
   a line interface unit having an IPv6 address,
   wherein the first network address is an IPv6 address or an IPv4 address,
   wherein the second network address is an IPv4 address or an IPv6 address and is different in form from the first network address, and
   wherein, when the literal IPv4 address of the URL is converted to a literal IPv6 address, the address converter converts the literal IPv4 address to an IPv6 address by applying a prefix of the IPv6 address of the line interface unit to the literal IPv4 address of the URL.

2. The apparatus according to claim 1, wherein the address converter includes:
   a response message conversion unit which converts, when a URL expressed as the literal first network address is written in a response message from the server, the literal first network address to a literal second network address; and
   a request message conversion unit which converts, when a URL expressed as the literal second network address is written in a request message requesting a connection to the URL written in the response message received from the client terminal, the literal second network address to a literal first network address.

3. The apparatus according to claim 1, wherein
   when the literal IPv6 address of the URL is converted to the literal IPv4 address, the address converter converts the literal IPv6 address to an IPv4 format by removing the prefix portion of the literal IPv6 address of the URL.

4. A method for use by an apparatus that relays between a server to which a first network address is allocated and a client terminal to which a second network address is allocated and that includes a line interface unit having an IPv6 address, the method comprising the steps of:

analyzing, by an analyzer, a message corresponding to Layer 7 of an OSI basic reference model of a received packet and determining whether a URL expressed as a literal network address is included in the message; and when a URL expressed as a literal network address is included in the message, mutually converting, by an address converter, the literal network address in the URL between the first network address and the second network address, wherein the first network address is an IPv6 address or an IPv4 address, wherein the second network address is an IPv4 address or an IPv6 address and is different in form from the first network address, and wherein, when the literal IPv4 address of the URL is converted to a literal IPv6 address, the literal IPv4 address is converted to an IPv6 address by applying a prefix of the IPv6 address of the line interface unit to the literal IPv4 address of the URL.

5. A non-transitory computer-readable medium that stores a program which, when executed, performs a method for relaying between a server to which a first network address is allocated and a client terminal to which a second network address is allocated, said method comprising:

analyzing a message corresponding to Layer 7 of an OSI basic reference model of a received packet and determining whether a URL expressed as a literal network address is included in the message; and when a URL expressed as a literal network address is included in the message, converting the literal network address in the URL between the first network address and the second network address, wherein the first network address is an IPv6 address or an IPv4 address, wherein the second network address is an IPv4 address or an IPv6 address and is different in form from the first network address, and wherein, when the literal IPv4 address of the URL is converted to a literal IPv6 address, the address converter converts the literal IPv4 address to an IPv6 address by applying a prefix of an IPv6 address of a line interface unit to the literal IPv4 address of the URL.

\* \* \* \* \*